(12) United States Patent
Dewald et al.

(10) Patent No.: US 7,385,747 B2
(45) Date of Patent: Jun. 10, 2008

(54) ILLUMINATION SYSTEM WITH INTEGRAL MODULATION TECHNIQUE

(75) Inventors: Duane Scott Dewald, Dallas, TX (US); Michael T. Davis, Richardson, TX (US); Bryce Daniel Sawyers, Allen, TX (US)

(73) Assignee: Texas Instruments Incorporated, Dallas, TX (US)

( * ) Notice: Subject to any disclaimer, the term of this patent is extended or adjusted under 35 U.S.C. 154(b) by 182 days.

(21) Appl. No.: 11/292,159

(22) Filed: Dec. 1, 2005

(65) Prior Publication Data

US 2007/0127106 A1 Jun. 7, 2007

(51) Int. Cl.
*G02B 26/00* (2006.01)

(52) U.S. Cl. ...................... 359/237; 359/291

(58) Field of Classification Search ............. 359/290, 359/291, 292, 293, 295, 298, 220, 223, 224, 359/320, 237; 353/30, 31, 84, 320
See application file for complete search history.

(56) References Cited

U.S. PATENT DOCUMENTS

| | | | |
|---|---|---|---|
| 6,049,317 A * | 4/2000 | Thompson et al. ........... 345/85 |
| 6,558,000 B2 * | 5/2003 | Muehlhoff et al. ............ 353/30 |
| 6,829,089 B2 * | 12/2004 | Agostinelli et al. ......... 359/466 |
| 6,857,751 B2 | 2/2005 | Penn et al. |
| 6,906,848 B2 * | 6/2005 | Aubuchon ................... 359/291 |
| 7,106,491 B2 * | 9/2006 | Meyer et al. ................ 359/291 |
| 7,183,633 B2 * | 2/2007 | Daneman et al. ........... 257/678 |
| 2005/0270528 A1 * | 12/2005 | Geshwind et al. .......... 356/330 |
| 2007/0058142 A1 * | 3/2007 | Radominski et al. ......... 353/99 |

* cited by examiner

*Primary Examiner*—David Spector
*Assistant Examiner*—Tuyen Tra
(74) *Attorney, Agent, or Firm*—Wade James Brady, III; Frederick J. Telecky, Jr.

(57) ABSTRACT

A system and method for the modulation of light propagating along an optical path, for example the optical path in a projection display system. As light in the optical path travels from a light source to a display screen, it is shaped and modulated by the various components of the optical path so that the intended visual image appears on the display screen. In accordance with the present invention, a mirror disposed proximate the optical path is operable to be selectively inserted and removed from the optical path to alternately direct the light from one portion of the optical path to another, or to a light dump where it can be absorbed such that the associated heat energy may be properly dissipated. In a preferred embodiment, the mirror is a fold mirror mounted at a stop of the system to fold the light beam approximately 90 degrees when the mirror is inserted in the optical path.

24 Claims, 6 Drawing Sheets

ILLUMINATION SYSTEM WITH INTEGRAL MODULATION TECHNIQUE

TECHNICAL FIELD

The present invention relates generally to the field of projection display systems, and relates more particularly to a display system employing an illumination relay coincident with a fold mirror located at a stop in the system that is operable to selectively retract and insert into the optical path for directing downstream light transmission in a manner that improves system efficiency.

BACKGROUND

Projection displays are used for a wide variety of applications, such as producing the pictures viewed on television screens. A typical projection display system includes a number of components, including the screen, a light source, and an optical path between them. To create the pictures, one or more light sources are provided to emit light when it is needed. The light they produce is then manipulated by a series of optical devices in order to create the visual image. The visual image created along the optical path is then displayed on the visual-image display screen, the television screen for example, or another visual display. In most cases, the goal is to produce the best picture possible. The key to producing a desirable visual display, of course, is the configuration of the various optical devices along the optical path. The selection, operation, and configuration of these devices also contributes to unseen characteristics of the system, such as cost and efficient use of system resources.

Several types of projection displays have recently been developed. These new display systems are now becoming much more common, serving as a replacement for the widely-used CRT (cathode ray tube) display, which produces a visual image by producing and directing a stream of electrons at a treated display surface. The stream could only be directed to one point at any given time, but can be systematically swept across the display with such speed as to create the visual impression of a single image. This technology is fairly well-developed, but has reached the point where perceptible increases in quality are difficult to achieve. A CRT also takes up a relatively-large amount of space because the components used for generating the electron stream must be placed at a certain distance from the display screen. Many recently-developed projection display systems, in contrast, feature a much slimmer profile. In addition, projection display systems often produce much cleaner visual images. The combination of these advantages has made such systems immensely popular.

Figure 1:
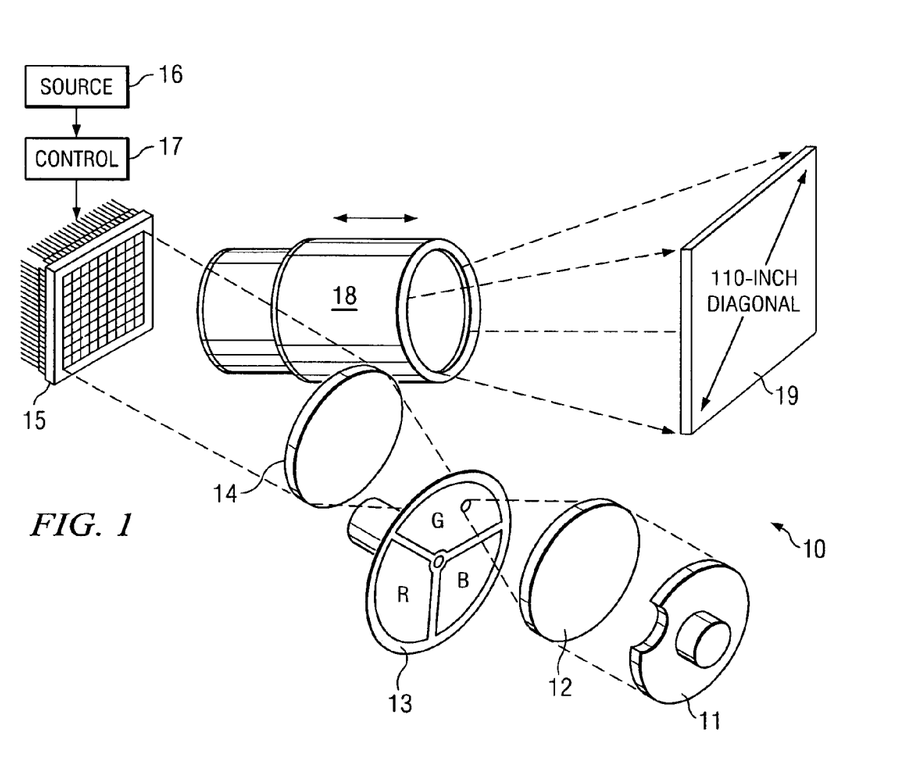
FIG. 1 is a simplified diagram illustrating an exemplary DMD-type projection display system.

One such projection-display system is commercially available from Texas Instruments of Dallas, Texas under the trademark DLP® (or Digital Light Processing®). DLP® projection-display systems utilize a digital micromirror device (DMD) in their optical path. The DMD typically includes an array of thousands of tiny mirrors that are use to manipulate light originating at an internal light source. Other components in the optical path adjust the light for use by the DMD, or convey the image it generates. FIG. 1 is a simplified diagram illustrating an exemplary DMD-type projection display system 10.

In the display system 10 of FIG. 1, light source 11, which may be, for example, an arc lamp or an LED, emits light that first passes through a first condenser lens 12. Some light sources tend to produce a Lambertian emission and condenser lens 12 helps to produce a more focused (and more useful) beam of light, which then proceeds downstream to color wheel 13. (Note that the light-travel direction will for convenience sometimes be referred to simply as downstream). In FIG. 1, color wheel 13 has three sections; red, green, and blue, through which the light beam passes as the wheel rotates. Color wheel 13 may, for example, rotate once per frame of displayed image so that the light (when the light source is on) passes through each of the different sections in turn. Currently, a typical color wheel (not shown) may have as many as six to eight color segments and make two to three revolutions per frame.

After passing through the color wheel 13, the light passes through a second condenser lens 14 and then falls onto DMD chip 15. As mentioned above, DMD chip 15 includes thousands of micromirrors (as many as a million or more), mounted, for example, on a semiconductor chip. Note that for convenience herein, both the DMD and the chip-mounted device will be referred to simply as a DMD. Each micromirror is associated with a digital memory cell (not shown) and is mounted such that it can be individually adjusted so that light striking it can be selectively directed as necessary to create the visual image. This image is formed according to input from a source 16. Source 16 is shown as a single block that represents a variety of possible sources, for example a broadcast television station, a DVD, or a game playing device. While the source 16 provides indications of the image desired, control 17 generates the input for storage in the digital memory cells that will ultimately determine the position of each micromirror at any given instant. Light selectively reflected from DMD 15 for the image then passes from each of the selected mirrors then passes through a projection lens 18 so as to create the visual image on screen 19.

The visual image created on screen 19, of course, is a function of the position if each of the DMD micromirrors are selected at any given time. It is also a function of the quality of light that reaches the DMD 15. The use of color wheel has already been mentioned. In addition, the light may be intermittently blocked, altering the quality of light available for reflection by the DMD micromirrors. Current methods for blocking the light path, however, generally require the absorption of light by elements that form part of the optical path itself. Frequently, this produces problems related to the undesirable buildup of excess heat energy. Needed then, is a way to direct light in a projection display system so that is may be properly modulated while at the same time permitting discharge of unneeded light energy without excess heat buildup or the need for additional cooling measures. The present invention provides just such a solution.

SUMMARY OF THE INVENTION

The present invention is directed at an efficient illumination system that modulates the light in a projection in order to, for example, increase bit depth and improve contrast in the visual images produced by the system. The system and method of the presenting invention also alleviate problems typically associated with excess heat buildup that are encountered when using prior modulation schemes.

In one aspect, the present invention is a projection display system having a light source for emitting the light used to create a visual image and a display screen for displaying the visual image. The light source and the display screen define the ends of an optical path, which is a collection of optical devices that direct and modulate the light in order to produce the desired image. A mirror or functionally equivalent reflecting surface is insertable into, and retractable out of the optical path so that some or all of the light propagating along the path may be selectively directed from a first portion or the optical path to another portion downstream from the mirror. Modulated light continuing along the optical path is further modulated to create the image itself, in one embodiment using a digital micromirror device (DMD). The mirror insertion and retraction is controlled by a controller that preferably controls operation of the light source and the DMD (or other spatial light modulation device) as well. The controller is coupled to an image source from which image information is obtained.

In another aspect the present invention is an optical path for use in a display system. The optical path includes a first portion that receives light from a light source, a retractable fold mirror located at a stop of the system that may be inserted into the optical path to selectively fold all or a portion of the propagating light, preferably at an angle of approximately 90 degrees, toward a second portion of the optical path. Light not so directed falls upon a light dump disposed outside of the optical path, where may be absorbed and the associated heat energy efficiently dissipated in a way that minimally impacts the optical path components. Alternately, the optical path is oriented so that removing the mirror from the path directs the light to a downstream optical-path portion and inserting the mirror directs all or a portion of the light to the light dump. The fold mirror may be mounted on a track for sliding the mirror out of the optical path laterally using a retraction member attached to the mirror or to a frame holding the mirror. In another embodiment, the mirror may be mounted so as to rotate either out of the optical path entirely or out of the optical path by virtue of eliminating the direction of any light to the downstream portion of the optical path.

In another aspect, the present invention is a method for modulating light in a projection display system, including the steps of receiving light receiving light in a first portion of an optical path and selectively directing the received light to a second portion of the optical path using a fold mirror that may be inserted into and removed from the path of the received light. All or a selected portion may be so directed, and the light not directed to the second portion of the optical path may be directed to a light dump. The method may also include the steps of providing a light source, with the light source and the fold mirror operation controlled by a controller that is coupled to an image-information source. The method may also include the steps of further modulating the light directed to the second optical path portion to create a visual image, and displaying the created image on a display screen.

The primary advantage of the preferred embodiment of the present invention is that the illumination uniformity at the modulator (DMD) will remain uniform as the mirror is moved. This is due to the optical property of locating the mirror at the aperture stop of the illumination optical path.

An advantage of a preferred embodiment of the present invention is that light may be more completely modulated to increase the contrast and bit depth for the projection display, which may, for example, be the display screen of a high definition television (HDTV).

A further advantage of a preferred embodiment of the present invention is that the higher-quality images are obtained with a system that simplifies the mechanical operation of the system and provides greater latitude in image generation while at the same time applying modulation techniques that minimize the buildup of excess heat in undesirable locations along the optical path.

As more complete appreciation of the present invention and the scope thereof can be obtained from the accompanying drawings that are briefly summarized below, the following detailed description of the presently-preferred embodiments of the present invention, and the appended claims.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and are not intended to limit its scope.

The present invention will be described with respect to preferred embodiments in a specific context, namely a projection display system that produces visual images on a display screen using spatial light modulation (SLM). The invention may also be applied to advantage, however, in other optical systems that modulate light to produce visual images for display.

Naturally, in any projection display system one goal is to produce a visual image of high quality on the visual image display screen. The techniques used to accomplish this goal, however, generally are limited by other design constraints such as the cost of certain components or the difficulties encountered in reliably performing the technique. In most cases the amount of space taken up by the components required for performing the technique is also a consideration, especially with modem display system applications such as HDTV where having limited depth dimension is a great commercial advantage. This in turn also leads to design constraints related to the dissipation of heat produced by the electrical and light transmitting portions of the system.

One measure of the quality of a visual image is contrast. Contrast refers to the difference in brightness between one portion of the image and another, or many others. When presenting an image, the contrast that may be produced depends on the ability to modulate the light used to make the image to create a variety of different intensities. While a beam of light produced by a light source may theoretically be altered to almost any intensity level, in practice the number of different levels depends on how many bits (units of information) are available for designating a certain level to a modulating device. The maximum number of bits available is often referred to as the bit depth. Increasing the bit depth will therefore have a positive impact on picture quality.

In a projection display system the visual image is itself produced by a device that modulates a light beam such that the display screen is properly illuminated. A device such as a DMD in fact creates the image, component by component, and directs it to the display screen, normally through a projection lens that enlarges the image for presentation. Controlling the quality of light that arrives at the DMD, however, also contributes to the resulting image. The configuration of the optical path between the light source and the DMD effects this control.

As mentioned above, the optical path, as that term is used herein, refers to the path taken by light traveling from a light source to a visual display screen or similar destination, and is defined by the various devices used to direct and modify the light as it propagates. Note that while the light source and the display screen typically define the ends of the optical path, whether they are actually considered a part of it is not material to the present disclosure unless explicitly stated or evident from context. The term 'optical path' may also at times be used to refer to a portion of the overall optical path, that is, the term does not necessarily imply the presence of components not mentioned in a particular context. An optical path in which the present invention may be advantageously applied will now be described.

Figure 2:
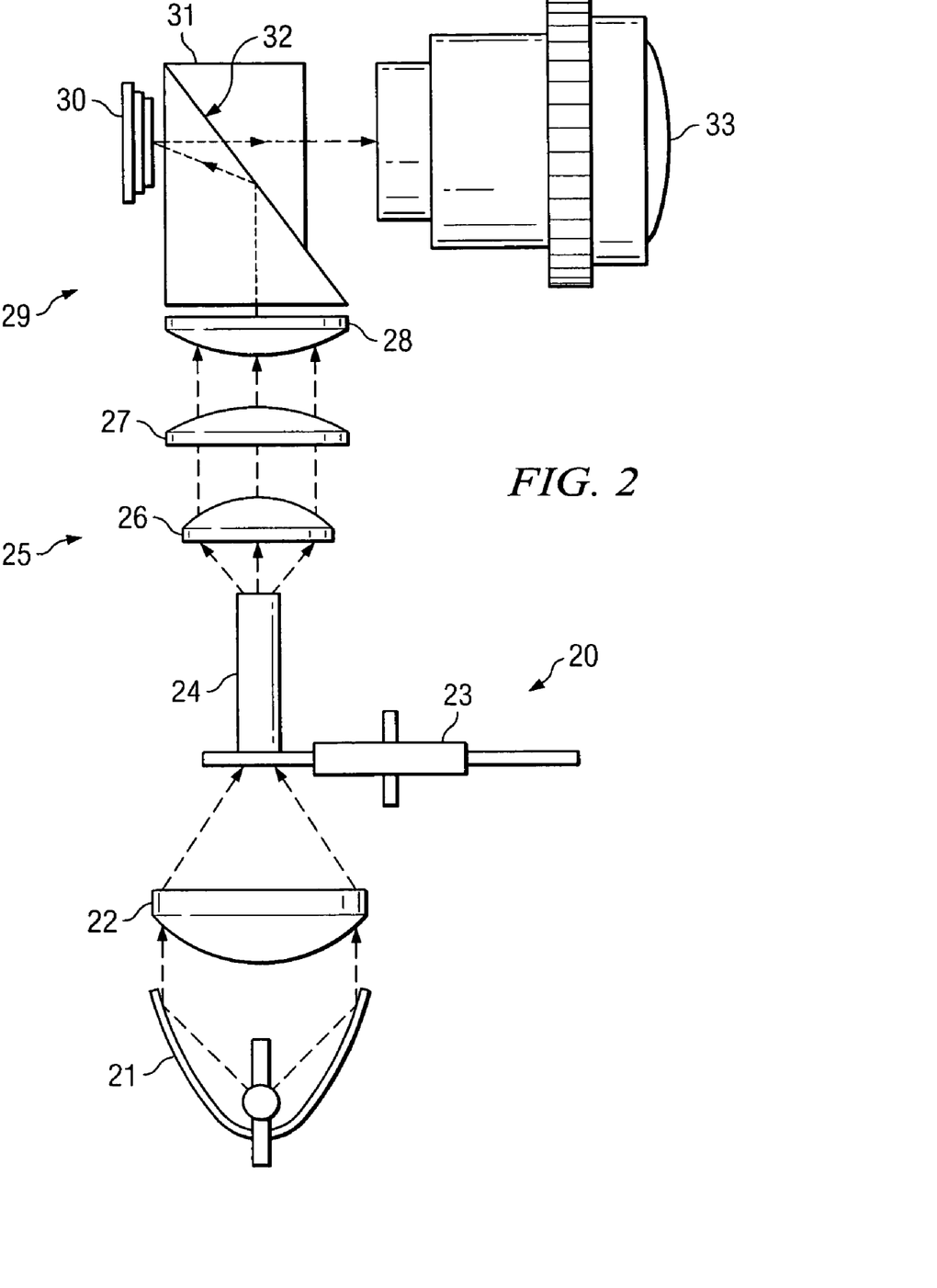
FIG. 2 illustrates a typical optical path that may be used in a projection display system, and which may be modified in accordance with the present invention.

FIG. 2 illustrates a typical optical path 20 that may be used in a projection display system, and which may be modified in accordance with the present invention, as will be described below. In the optical path 20, a DMD 30 is illuminated by light passing through a total internal reflection (TIR) prism system (denoted generally as 29) The optical path 20 of FIG. 2 includes a high-intensity lamp assembly 21 as a light source. Light from a light source 21, in this example, white light from a high-intensity UHP (ultra high pressure) arc lamp, first passes through condenser lens 22, which focuses the light before it falls on rotating color filter wheel assembly 23. There, the light is converted into primary wavelengths (such as red, green, and blue) by a sequence of filters arranged on a spinning disc. The light so converted then passes through integrator rod 24 to produce a uniform light beam using multiple internal reflections in a transparent optical medium. From integrator rod 24, the light next passes through a set of relay lenses 25. The set of relay lenses 25 is typically made up of a first lens 26, a second lens 27, and a third lens 28, which shapes the colored light beam to fit the optical aperture of TIR prism assembly 29.

The sequenced, colored light passing into the TIR prism 31 strikes a first TIR prism surface 32 at an angle greater than the critical angle of the surface and reflects off the surface onto the surface of DMD 30. Modulated light is reflected from appropriately-turned mirrors of DMD 30 back through the TIR prism assembly 29, and strike the TIR prism surface 32 at an angle less than the critical angle of the surface. This light therefore passes through the TIR prism surface 32, out of the prism assembly 29, and into the projection lens 33. Projection lens 33 focuses the image onto a visual-display screen (not shown in FIG. 2).

In the system described above, the light traveling along the optical path on its way to the DMD (or other SLM device) is modulated with respect to wavelength by the color wheel assembly 23. In accordance with the present invention, it may also (or instead) be efficiently modulated for intensity and continuity. This principle will now be described with reference to FIG. 3.

Figure 3:
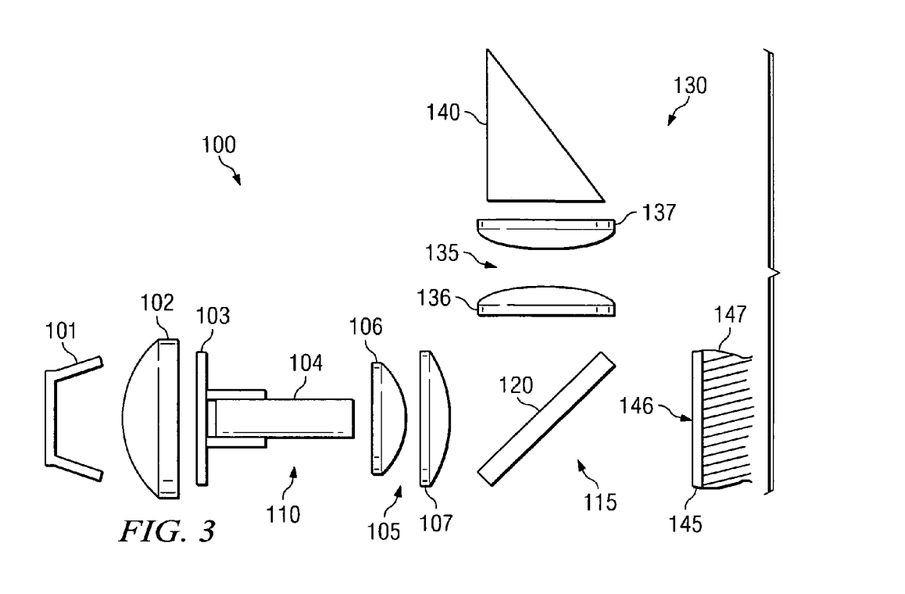
FIG. 3 illustrates an optical path that may be used in a projection display system according to an embodiment of the present invention.

FIG. 3 illustrates an optical path 100 that may be used in a projection display system according to an embodiment of the present invention. Note that the depiction of optical path 100 is similar to, although not identical and somewhat simplified from, the optical path 20 illustrated in FIG. 2. In accordance with this embodiment of the present invention, optical path 100 begins at light source 101. Light emitted by light source 101 enters condenser lens 102 so that it may focus on color wheel 103. After passing through color wheel 103, the light beam is integrated in integrator 104, and then passes through a first set of relay lenses 105. In this embodiment, first set of relay lenses 105 includes relay lens 106 and relay lens 107. Note that in describing this embodiment of the present invention, the optical devices 102 through 107 will be said to define a first portion 110 of the optical path 100.

After passing through the first set of relay lenses 105, the propagating light reaches a location designated as stop 115. Disposed at stop 115 is mirror 120, which is mounted so as to move in some fashion that will remove it from the optical path. Light striking the mirror 120 from the first portion 110 is reflected toward the second portion 130 of the optical path 100. In this embodiment, optical path second portion includes a second relay lens set 135 and a prism 140. The second set 135 of relay lenses includes lens 136 and lens 137. Note that optical path 100 illustrated in FIG. 3 is only a portion of the entire optical path used in a display system according to the present invention. In a preferred embodiment, light directed to the second portion 130 of optical path 100 will continue on to a DMD (not shown in FIG. 3) and modulated for projection onto a display screen. In such an embodiment, mirror 120 therefore affects the characteristics of the light that reaches the DMD, and ultimately the displayed visual image.

In operation, mirror 120 is selectively removable from the optical path 100. In the embodiment of FIG. 3, when mirror 120 is removed, it does not reflect light from first optical path portion 110 to second portion 130, but rather allows it to pass to the light dump 145. Light dump 145 is located outside the optical path 100 and includes, for example, a sheet of aluminum, which has facing optical path 100 a surface 146 that has been blackened. Light dump 145 is mounted on a substrate 147 or other structure that functions as a heat sink to assist in dissipating the heat energy of the light directed toward it. The presence of a light dump such as light dump 145 is preferred but not required.

In the embodiment of FIG. 3, light originating at light source 101 is in this way directed to either the light dump 145 or to the second portion 130 of optical path 100. Note that the term 'directed' is used in this way herein notwithstanding the fact that when the mirror 120 is removed from the optical path 100, the light simply continues on in the direction it had been going when it reached stop 115. In another embodiment (not shown) light traveling in the first and second portions of an optical path propagates in generally the same direction, and mirror 120, when inserted, causes the light to be directed to a light dump by reflecting it in an appropriate direction. In the preferred embodiment of FIG. 3, however, mirror 120 is a fold mirror that folds the light received from first portion 110 approximately 90 degrees so that it continues one to second portion 130. It should also be noted that by partially inserting or removing the mirror 120, a portion of the light is directed to the light dump 145 and a portion to second portion 130 of optical path 100.

In this way, a display system associated with optical path 100 is provided with a mechanism for modulating light from the light source 101 even before it is eventually modulated by the DMD located downstream. By selectively varying the character of the light reaching the DMD, greater bit depth is achieved and sharper contrast may be present in the visual image displayed on the system display screen. Among the characteristics affected by selective insertion of mirror 120 into optical path 100 are those that may be described as intensity and continuity. As should be apparent, the light traveling through optical path second portion 130 to a downstream DMD will be less intense if only a portion of the light reaching mirror 120 is directed that way. When totally directed to the light dump 145, of course, no light passes into second portion 130 at all. This does not mean, however, that the visual display screen will be dark. The temporary (and typically very short) interruption of the light beam will not be directly perceptible. The displayed image will be altered by providing light of a different quality to the DMD, but the image will nevertheless appear to the viewer to be continuously displayed.

Figure 4:
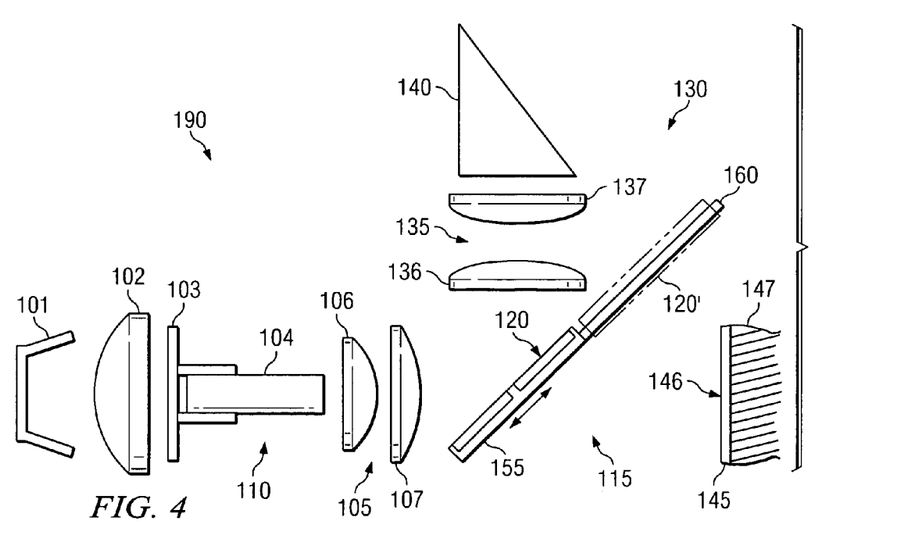
FIG. 4 illustrates an optical path that may be used in a projection display system according to another embodiment of the present invention.
Figure 5:
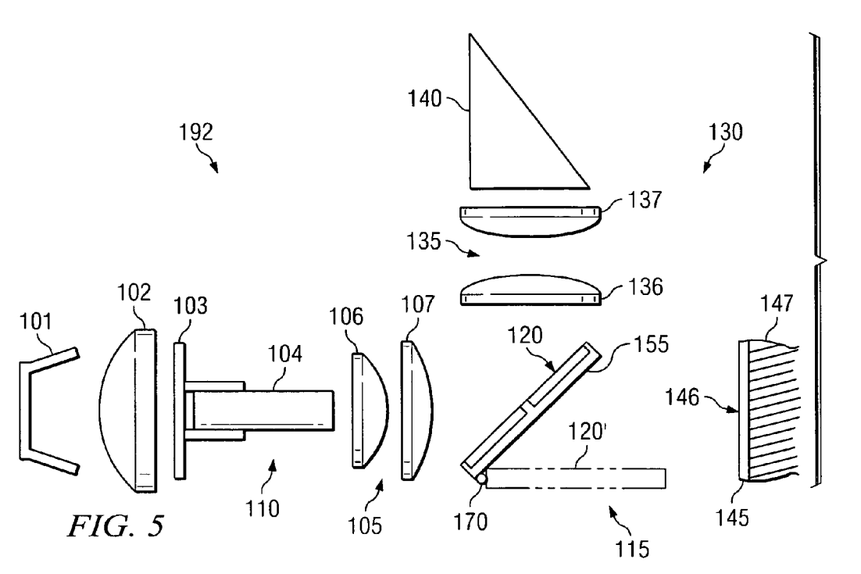
FIG. 5 illustrates an optical path that may be used in a projection display system according to another embodiment of the present invention.
Figure 6:
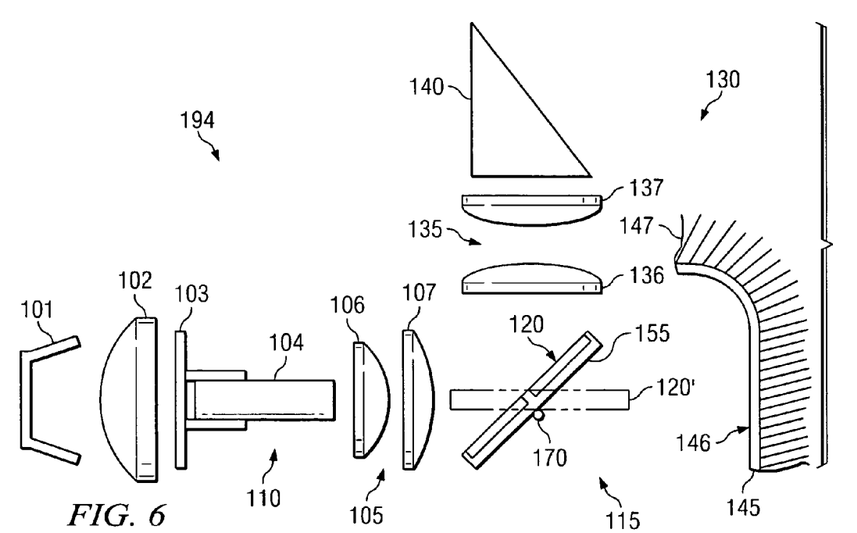
FIG. 6 illustrates an optical path that may be used in a projection display system according to another embodiment of the present invention.

There are a number of ways in which mirror 120 may be mounted. FIGS. 4 through 6 illustrate exemplary alternatives. Note that in these Figures, the optical path 100 is the same as that illustrated in FIG. 3, and the individual components common to all of these Figures need not be described again. FIG. 4 illustrates an optical path 190 that may be used in a projection display system according to another embodiment of the present invention. Here, mirror 120 is mounted in a frame 155, which is in turn coupled to a retraction member 160. In operation, retraction member 160 moves back and forth in a longitudinal direction (shown with an arrow) so that mirror 120 may be moved in and out of the optical path 190. The broken line 120' shows the location of the (fully) retracted mirror. In some embodiments, the mirror may be mounted (held in place) only by frame 155 and retraction member 160. In other embodiments, mirror 120 and frame 155 are mounted on a track (not shown) that permits sliding, and retraction member 160 provides only the force necessary to insert or remove the mirror by sliding it along the track.

The mirror 120 may also be rotatably mounted. FIG. 5 illustrates an optical path 192 that may be used in a projection display system according to another embodiment of the present invention. In the embodiment of FIG. 5, instead of a retraction member as shown in FIG. 4, frame 155 is formed to include (or is attached to) a post 170 about which the framed mirror 120 may rotate to remove it from the optical path 100. In this embodiment, post 170 is located approximately at one end of the frame 155. This is not the only location that may be used, however. FIG. 6 illustrates an optical path 194 that may be used in a projection display system according to another embodiment of the present invention. In the embodiment of FIG. 6, the post is located near the middle of frame 155. In this case, the mirror does not physically leave the optical path 194; it simply rotates such that no (or not all of the) light is directed to the second portion 130 of optical path 100. For convenience, however, the mirror will be said, in this case, to have been removed or partially removed from the optical path. It is noted that in embodiments where the mirror rotates, light may be reflected at some angle, even if not sufficiently to reach the components of the optical-path second portion 130. In these circumstances, it may be desirable to extend the light dump 145 to absorb more of the unused light. One example of this is shown in FIG. 6.

Figure 7:
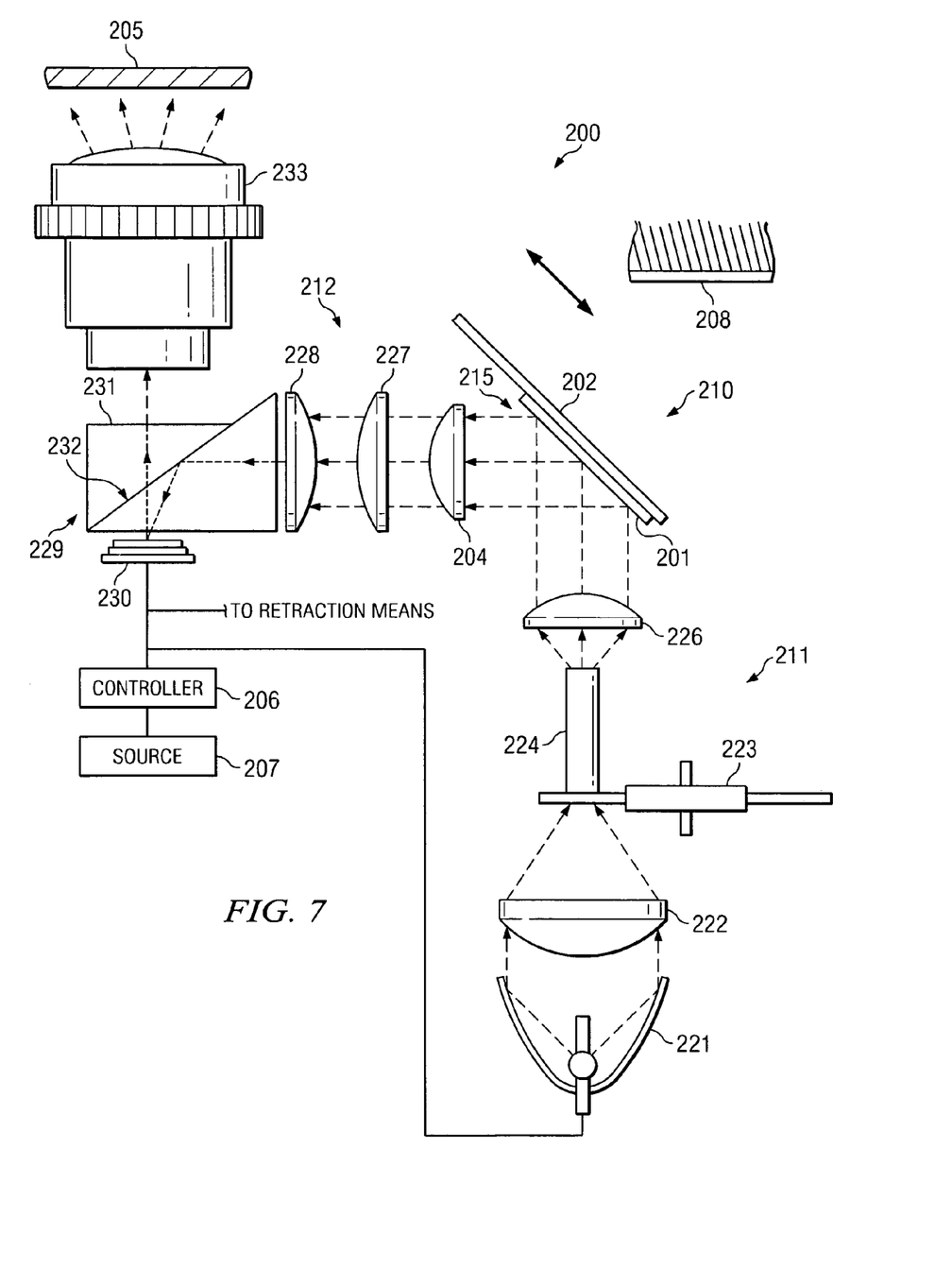
FIG. 7 is a diagram illustrating selected components of a projection display system according to another embodiment of the present invention.

FIG. 7 is a diagram illustrating selected components of a projection display system 200 according to an embodiment of the present invention. As should be apparent, the display system 200 of FIG. 7 includes many of the same components as the optical path 20 of FIG. 2, and like components are similarly numbered. In addition, mirror 201 has been inserted between lens 226 and lens 204 for operation in accordance with the present invention. In this embodiment, mirror 201 is mounted directly onto retraction member 202, which in operation, slides the mirror 201 into and out of optical path 210. Operation of the light source 221, DMD 230, and retraction member 202 is controlled by controller 206 in order to produce a visual image on display screen 205 based on image information received from source 207.

In this embodiment, when mirror 201 is in (or partially in) optical path 201, light is folded approximately 90 degrees and directed from optical path first portion 211 to optical path second portion 212. Any light emitted by light source 221 and not folded toward second portion 212 is directed to light dump 208. Optical path 210, in other words, has been effectively divided into a first portion 211 and second portion 212, which ends at display screen 205, by fold mirror 201. It should be noted, however, that the division between the two portions of the optical path did not have to occur precisely at this location, and could alternately occur between other components as well. The mirror 120, however, is preferably placed at stop 215 of the optical path 210 so that the illumination at DMD 230 will remain uniform even as the mirror is moved. It is also noted that in FIG. 7, as with the other Figures, no representation of scale or relative size is intended. The various components may be relatively nearer to or farther from the other components. The number and relative size of the optical path components may also vary.

Figure 8:
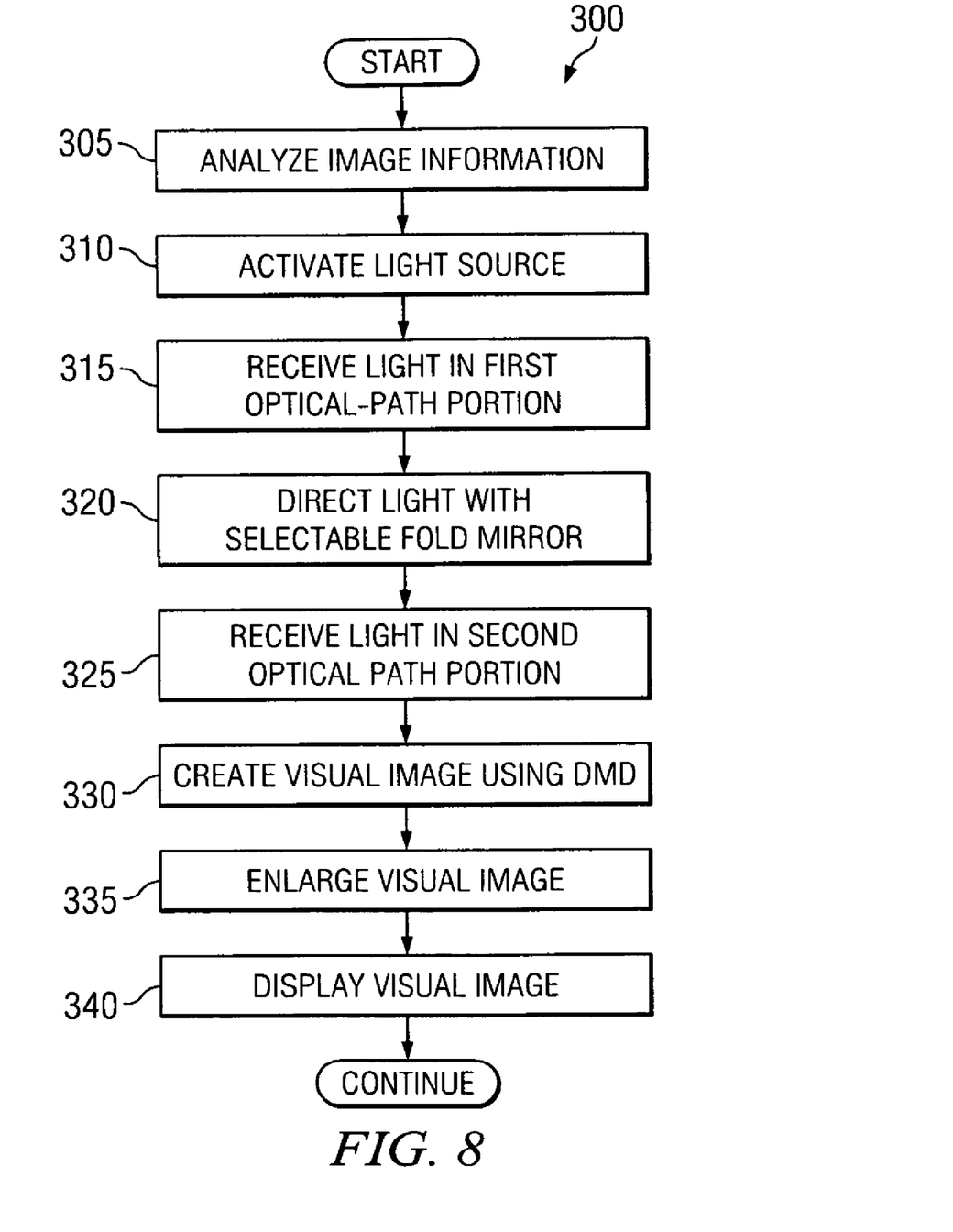
FIG. 8 is a flow diagram illustrating a method of modulating light in a projection display system according to an embodiment of the present invention.

FIG. 8 is a flow diagram illustrating a method of modulating light in a projection display system 300 according to an embodiment of the present invention. At START, it is presumed that a display system such as display system 200, depicted in FIG. 7, is operable. It is also presumed that some source has provided information that may be used to construct visual images using the display system. The system controller then analyzes the visual-image information from the source, in order to direct the active system components how to modulate the light in the light path to produce the desired effect (step 305). The active components include, for example, light source 221, fold mirror 201, and DMD 230 (shown in FIG. 7), each of which, when present, will perform a function in order to properly modulate the light from the light source and create the visual image on a display screen. (Inactive components, such as stationary lenses and prisms, of course, may be said also to influence the modulation of the propagating light, but their function in this regard is not controlled by the controller.)

Once the program for operation has been determined, at least to the extent necessary for initially displaying an image, the light source is activated (step 310). In this embodiment, the light emitted from the light source is then received in a first portion of the optical path (step 315). The light then reaches the fold mirror and is directed (step 320), either along to a second portion of the optical path or to a light dump. In one embodiment this is accomplished by sliding the fold mirror in and out of the optical path. When the mirror has been inserted into the optical path, the light from the relay lenses is folded at a 90 degree angle so that it proceeds to be received (step 325) in a second portion of the optical path. In another embodiment (not shown), the fold mirror may fold the light it receives to a light dump, and moves out of the optical path to allow the light to direct the light downstream to a second optical-path portion.

The mirror may, as mentioned above, also be positioned so as to reflect only a portion of the light to a subsequent portion of the optical path (or, in an alternate embodiment, to the light dump). Note, however, that in certain embodiments of the present invention some of the light reaching the stop where the mirror is disposed may not be directed to either the light dump or to the next portion of the optical path, but this is not preferred, and, in most cases, this scenario should be avoided. The selectively-insertable mirror in this way modulates the light in the optical path. Of course, this action of the mirror generally will not in itself form the visual image. That function will be performed in large part by a DMD in step 330. The image is then enlarged by a projections lens (step 335) before being displayed on a display screen (step 340).

Although the present invention and its advantages have been described in detail, it should be understood that various changes, substitutions and alterations can be made herein without departing from the spirit and scope of the invention as defined by the appended claims. For example, many of the features and functions discussed above can be implemented in software, hardware, or firmware, or a combination thereof. As another example, it will be readily understood by those skilled in the art that the steps of the method of the present invention and the selection of certain components for the optical path may be varied while remaining within the scope of the present invention.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A display system, comprising:
    a light source;
    a spatial light modulator;
    an optical path for directing light from the light source to the spatial light modulator, the optical path comprising a mirror for modulating the light; and
    a controller for controlling the mirror;
    wherein the mirror is selectively insertable into and removable out of the optical path to regulate transmission of the light to the spatial light modulator.

2. The display system of claim 1, wherein the mirror is also selectively partially insertable into the optical path to allow transmission of a portion of the light.

3. The display system of claim 1, wherein the spatial light modulator is a DMD.

4. The display system of claim 1, wherein the mirror is a fold mirror.

5. The display system of claim 4, wherein the fold mirror, when inserted into the optical path, folds the light at an angle of approximately 90 degrees.

6. The display system of claim 4 wherein the fold mirror is placed at a stop of the optical path.

7. The display system of claim 1, wherein the selectively-insertable mirror reflects light along the optical path when inserted.

8. The display system of claim 1, further comprising a light dump for absorbing light from the light source that is not transmitted along the optical path by operation of the mirror.

9. The display system of claim 1, wherein the mirror is mounted such that it translates laterally when inserted or removed from the optical path.

10. The display system of claim 1, wherein the mirror is rotatably mounted such that it rotates about an axis of rotation when inserted or removed from the optical path.

11. The display system of claim 10, wherein the axis of rotation is located at an end of the mirror.

12. The display system of claim 1, wherein the display system is a projection display system.

13. An optical path for use in a display system, the optical path comprising:
    a light source for emitting light along a light path;
    a mirror selectably insertable into and removable out of the light path for controlling the propagation of the light along the light path;
    a spatial light modulator disposed in the light path after the mirror, the spatial light modulator for receiving the light transmitted along the light path; and
    a light dump for absorbing light emitted by the light source but not transmitted along the light path after the mirror.

14. The optical path of claim 13, further comprising an integrator tube disposed to collimate light emitted by the light source and at least one relay lens disposed to receive light collimated by the integrator tube;
    wherein the at least one relay lens is disposed between the integrator tube and the mirror.

15. The optical path of claim 14 wherein the mirror is disposed between at least one of the at least one relay lens and the light dump.

16. The optical path of claim 13, wherein the mirror is a fold mirror disposed at a stop of the optical path.

17. The optical path of claim 16, wherein the mirror folds a portion of the propagating light at an angle of approximately 90 degrees when partially inserted into the optical path.

18. The optical path of claim 17, wherein light not folded by the mirror is substantially absorbed by the light dump.

19. A method of providing modulated light in a visual display system, said method comprising:
    receiving light in a first portion of an optical path;
    selectively directing the received light to a second portion of the optical path, wherein the selective directing step is performed by inserting and retracting a fold mirror into and out of the optical path of the received light; and
    modulating the directed light in the second portion of the optical path with a spatial light modulator.

20. The method of claim 19, wherein the inserting the fold mirror directs at least a portion of the light to the second portion of the optical path.

21. The method of claim 19, wherein a light dump is positioned to receive light not directed to the second portion of the optical path.

22. The method of claim 19, further comprising emitting light from a light source toward the first portion of the optical path.

23. The method of claim 19, the modulating the directed light further comprising creating a visual image.

24. The method of claim 23, further comprising projecting the visual image toward a display screen.

* * * * *